US005489997A

United States Patent [19]

Usami

[11] Patent Number: 5,489,997
[45] Date of Patent: Feb. 6, 1996

[54] COLOR IMAGE PROCESSING APPARATUS

[75] Inventor: Akihiro Usami, Yokohama, Japan

[73] Assignee: Canon Kabushiki Kaisha, Tokyo, Japan

[21] Appl. No.: 797,967

[22] Filed: Nov. 26, 1991

[30]     Foreign Application Priority Data

Nov. 27, 1990  [JP]  Japan ................................ 2-326457
Nov. 22, 1991  [JP]  Japan ................................ 3-307799

[51] Int. Cl.$^6$ ........................................................ G03F 3/08
[52] U.S. Cl. .......................... 358/522; 358/501; 358/524; 358/523; 358/506; 358/518; 358/467; 358/487
[58] Field of Search ................................ 358/80, 75, 435, 358/523, 524, 530, 518, 500, 522, 515, 501, 467, 468, 404, 444, 479, 442, 400, 401, 403; 395/131; 382/9, 51, 54

[56]         References Cited

U.S. PATENT DOCUMENTS

| | | | |
|---|---|---|---|
| 4,559,563 | 12/1985 | Joiner, Jr. ............................... | 358/467 |
| 4,667,228 | 5/1987 | Kawamura et al. ....................... | 358/80 |
| 4,679,074 | 7/1987 | Sugiura et al. .......................... | 358/80 |
| 4,713,684 | 12/1987 | Kawamura et al. ....................... | 358/75 |
| 4,731,662 | 3/1988 | Udagawa et al. ......................... | 358/75 |
| 4,829,371 | 5/1989 | Hiramatsu et al. ....................... | 358/80 |
| 4,830,501 | 5/1989 | Terashita ................................ | 358/75 |
| 4,893,181 | 1/1990 | Yeomans ................................ | 358/80 |
| 4,908,701 | 3/1990 | Udagawa ................................ | 358/80 |
| 5,018,085 | 5/1991 | Smith, Jr. ............................... | 358/80 |
| 5,051,928 | 9/1991 | Gruters ................................ | 395/131 |
| 5,062,058 | 10/1991 | Morikawa ............................. | 395/131 |
| 5,073,818 | 12/1991 | Iida ..................................... | 358/80 |

FOREIGN PATENT DOCUMENTS

| | | |
|---|---|---|
| 0267805 | 5/1988 | European Pat. Off. . |
| 0363969 | 4/1990 | European Pat. Off. . |
| 0415648 | 3/1991 | European Pat. Off. . |
| 61-296858 | 12/1986 | Japan . |

*Primary Examiner*—Edward L. Coles, Sr.
*Assistant Examiner*—Fan Lee
*Attorney, Agent, or Firm*—Fitzpatrick, Cella, Harper & Scinto

[57]            ABSTRACT

A color image processing apparatus includes a storage device for storing input image data for one frame and a discriminator for analyzing the color image data stored in the storage device. In the color image processing apparatus, the discriminator discriminates the type of the stored color image data utilizing a membership function.

22 Claims, 9 Drawing Sheets a OR d b OR c e OR f

FEW    MANY

10

PIXELS TO BE SAMPLED

LUMINANCE
DENSITY
CONVERSION
RAM20

MASKING UCR22

COLOR IMAGE PROCESSING APPARATUS

BACKGROUND OF THE INVENTION

1. Field of the Invention

The present invention relates to a color image processing apparatus, which can automatically change processing according to the types of color images.

2. Related Background Art

A conventional color image processing apparatus designates a set of color correction functions for a color image, as disclosed in, e.g., Japanese Laid-Open Patent Application No. 61-296858.

In the conventional apparatus, no problem is posed when an input device which inputs an input color image is known. However, when a color image is temporarily stored in a computer, and is then sent to a color image processing apparatus, the type of the image cannot be identified. For example, there are many types of images including a CG (computer graphic) image, an input image from an image reader, an input image from a video camera or an SV (still video) camera, an input image from a film scanner, a synthesized image by remote sensing, and the like. Therefore, a user cannot determine color correction processing to be selected when the type of image cannot be identified.

In consideration of the above situation, the same assignee as the present application proposed, e.g., U.S. Pat. No. 4,679,074, U.S. Pat. No. 4,667,228, U.S. Pat. No. 4,731,662, U.S. Pat. No. 4,908,701, and the like. However, there is room for improvement in these applications.

SUMMARY OF THE PRESENT INVENTION

It is an object of the present invention to provide a color image processing apparatus in consideration of the above situation.

It is another object of the present invention to provide a color image processing apparatus, which can perform good image processing.

In order to achieve the above objects, according to an aspect of the present invention, there is disclosed an image processing apparatus for processing color image data input from an electronic device so as to be suitable for the electronic device, comprising discrimination means for discriminating a type of color image input from the electronic device, and means for controlling color correction processing according to the discriminated type.

It is still another object of the present invention to provide a color image processing apparatus, which can automatically discriminate an image data source on the basis of image data.

It is still another object of the present invention to provide a color image processing apparatus having good operability.

It is still another object of the present invention to provide a color image processing apparatus based on a novel algorithm.

Other objects and features of the present invention will become apparent from the following description of the embodiment.

BRIEF DESCRIPTION OF THE DRAWINGS

FIGS. 14A to 14C are graphs showing membership functions for distinguishing positive and negative films from each other, in which FIG. 14A shows membership functions of positive and negative films corresponding to the number of pixel data belonging to a region d) in FIG. 3, FIG. 14B shows a membership function representing a film corresponding to the number of pixel data belonging to a region b) in FIG. 3, and FIG. 14C shows a membership function representing a film corresponding to the number of pixel data belonging to a region g) in FIG. 3.

DETAILED DESCRIPTION OF THE PREFERRED EMBODIMENTS

Figure 1:
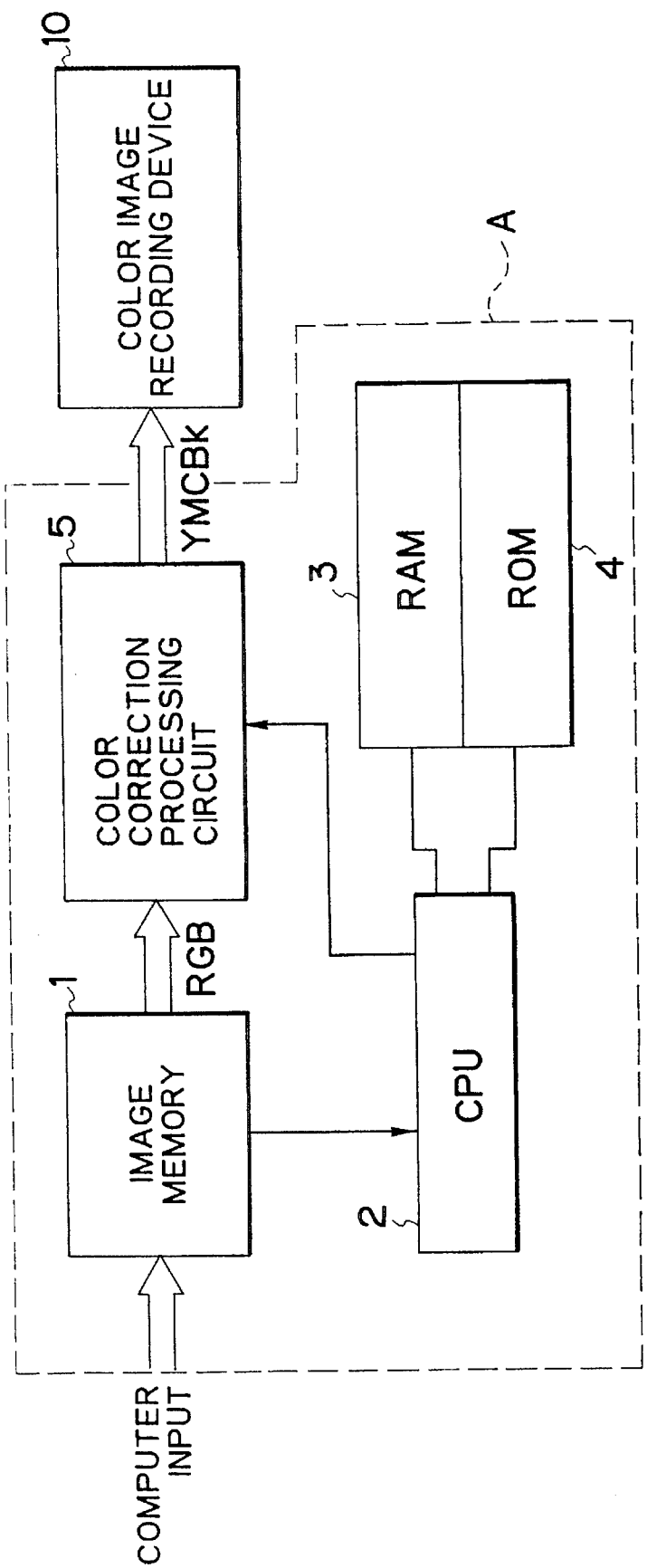
FIG. 1 is a block diagram showing the first embodiment of the present invention.

FIG. 1 is a block diagram showing an arrangement according to the first embodiment of the present invention. In FIG. 1, a controller A of a color image processing apparatus comprises an image memory 1 for storing image data input from electronic equipment such as a computer, a CPU 2 for controlling respective circuit portions, and determining parameters for a color correction processing circuit on the basis of a program and fuzzy deducing rule stored in a ROM 4, a work RAM 3 for the CPU 2, and a color correction processing circuit 5 for performing color correction processing on the basis of the parameters for the color correction processing circuit from the CPU 2. The output from the processing circuit 5 is output to a color image recording device 10.

The operation of this embodiment will be described below with reference to the flow chart shown in FIG. 7.

Figure 2:
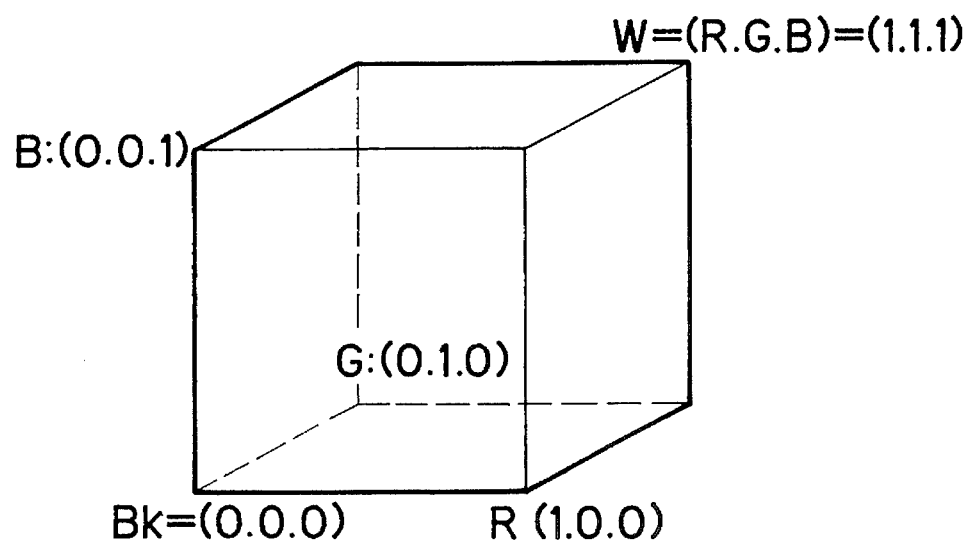
FIG. 2 is an explanatory view showing a color space.
Figure 3:
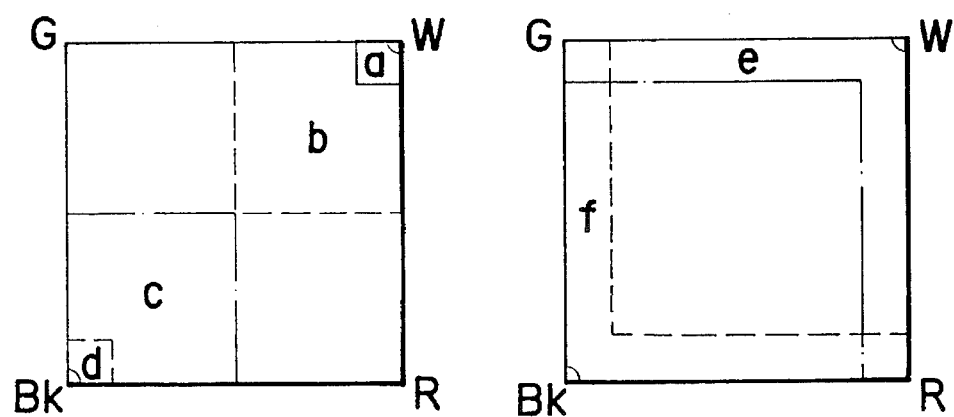
FIG. 3 shows an RG plane of the color space shown in FIG. 2.
Figure 5:
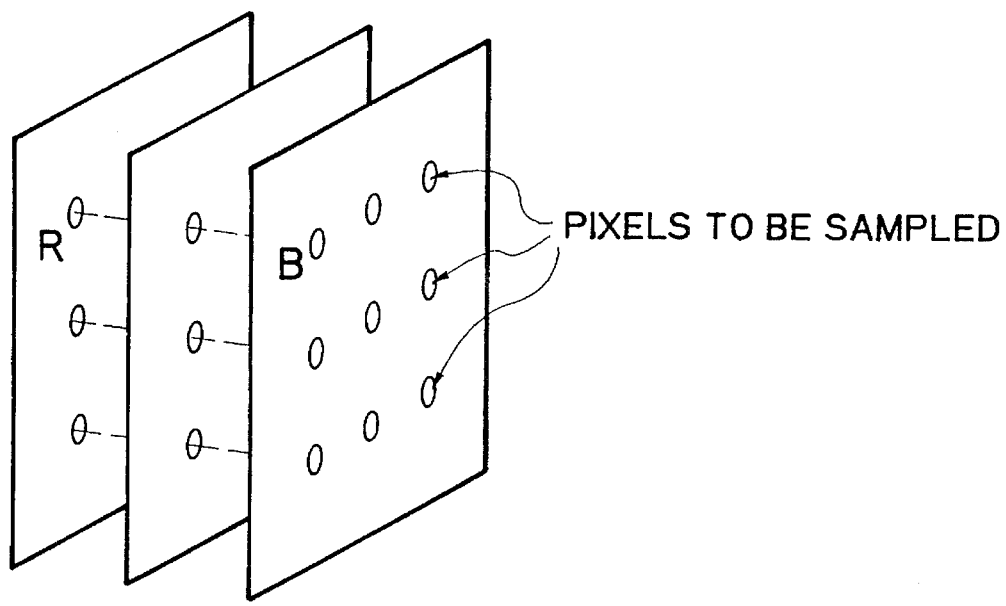
FIG. 5 is a view for explaining a sampling state of R, G, and B signals.

Various types of color images supplied from a computer are stored in the image memory 1 as R, G, and B signals (S10). The CPU 2 samples N sets of R, G, and B signals from the image memory using the RAM 3 and ROM 4 (S13, S15; FIG. 5). The sampled N sets of R, G, and B signals can be plotted on the coordinate system defined by a cubic color space shown in FIG. 2 if a maximum value of each of the R, G, and B signals is represented by "1", and a minimum value thereof is represented by "0". For this reason, the cube shown in FIG. 2 is divided into some divisional color spaces, as shown in, e.g., FIG. 3, and these spaces are stored in advance in the ROM 4. FIG. 3 shows an R-G signal plane of the cube shown in FIG. 2. In practice, the cube is three-dimensionally divided. The CPU 2 counts the number of signals of the N sets of R, G, and B signals, or the number of colors, which can fall within the divisional color spaces (S17). The count results are stored in the RAM 3.

A fuzzy deducing operation is performed on the basis of these data (S19).

In this embodiment, histograms of the above-mentioned divisional color spaces are formed so as to deduce the type of an image stored in the memory 1. In this embodiment, the following fuzzy deducing rules are prepared.

① An image having a small number of colors is a CG (computer graphic) image.

② An image which includes a large number of pixels in a region f in FIG. 3 is also a CG image.

③ An image which includes a large number of pixels in a region c in FIG. 3, and a small number of pixels in a region d is an image from an image reader.

④ An image which includes a large number of pixels in a region b in FIG. 3, and a small number of pixels in the region f is an image from a video camera or an SV camera.

Figure 4A:
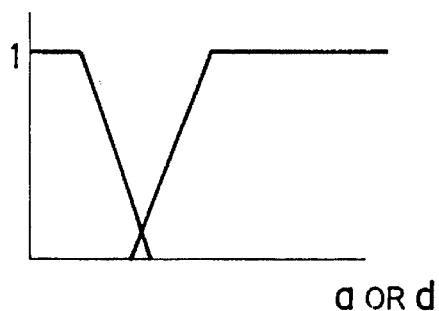
FIG. 4A to 4D are graphs showing membership functions according to the first embodiment of the present invention.
Figure 4B:
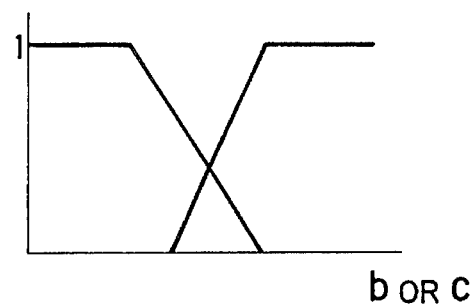
Figure 4C:
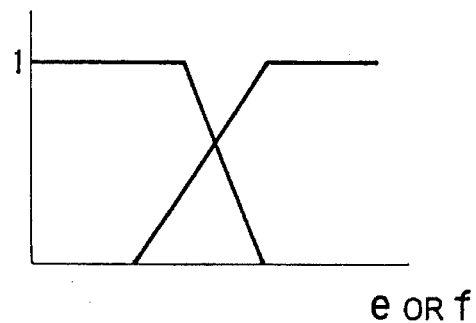
Figure 4D:
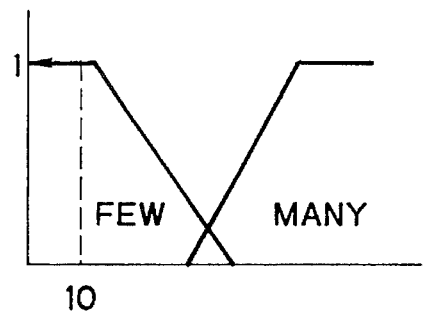

FIGS. 4A to 4D are graphs showing membership functions of the number of pixels or the number of colors in the corresponding regions, and these functions are stored in advance in the ROM 4. The rule ① will be exemplified below. Of the N sampled signals, when all the signals have different values, and different coordinates, the number of colors is N. In an image such as a computer image, the number of colors is relatively small, and is about 10. Therefore, upon application of the rule ①, if a "few" function shown in FIG. 4D representing the membership function of an "image including a small number of colors" is used, an output value is "1". The membership functions shown in FIGS. 4A, 4B and 4C based on other rules are set such that the output does not become "1" in this case. Therefore, the rule ① indicating that this image is a kind of CG image is established.

Thus, as the parameters of the color correction processing circuit 5, those for the CG image are set (21). For example, the parameters for improving saturation of colors are set.

Upon completion of the setting operation, corrected image signals are supplied from the image memory to the color image recording device (S23).

The rules other than the rule ① are also executed, and the CPU 2 is programmed to make a decision when a rule having a largest value as a then-part corresponding to an if-part of the rule is established. If there are rules having the same then-part value, the priority order is determined in advance.

Figure 6:
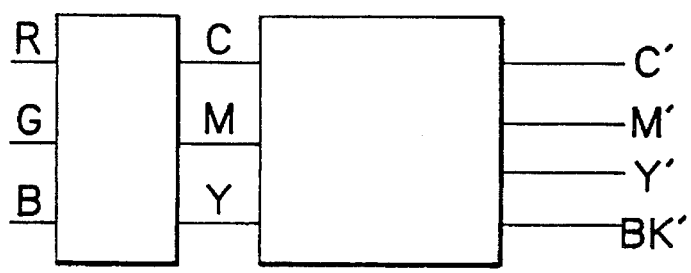
FIG. 6 is a block diagram of a color correction processing circuit according to the first embodiment of the present invention.

FIG. 6 shows an arrangement of the color correction processing circuit 5 shown in FIG. 2. In FIG. 6, the circuit 5 includes a luminance density conversion RAM 20, and a hardware circuit 22 for executing masking processing and UCR processing. As a method of changing parameters, a luminance density conversion table or masking and UCR coefficients may be changed.

[Another Embodiment]

The color correction processing circuit is not limited to an arrangement including two circuit components, as shown in FIG. 6. For example, the circuit may comprise a ROM, and ROM addresses may be switched according to the type of image discriminated by the CPU 2.

Even when an image is fetched by the image processing apparatus from a video camera or a film scanner in addition to a computer input, it can be automatically discriminated, and a good output image can be obtained.

The regions shown in FIG. 3 may be further divided, and the number of membership functions shown in FIGS. 4A to 4D may be increased to increase the number of types of images to be discriminated.

As described above, according to this embodiment, an image fetched from a computer is fuzzy-deduced by an arithmetic means so as to discriminate the type of image. On the basis of the discrimination result, the parameters for the color correction processing circuit can be set. As a result, a good image can be output without troubling a user.

As described above, according to the above embodiment of the present invention, since the type of color image input from the electronic equipment is discriminated, and color correction processing is controlled according to the discrimination result, good color correction processing can be automatically executed without troubling a user.

In the above embodiment, the feature of image data stored in a memory is discriminated to determine whether the input image is a CG image or a scanner image. In the following embodiment, a positive or negative image is determined based on image data stored in a memory.

Figure 8:
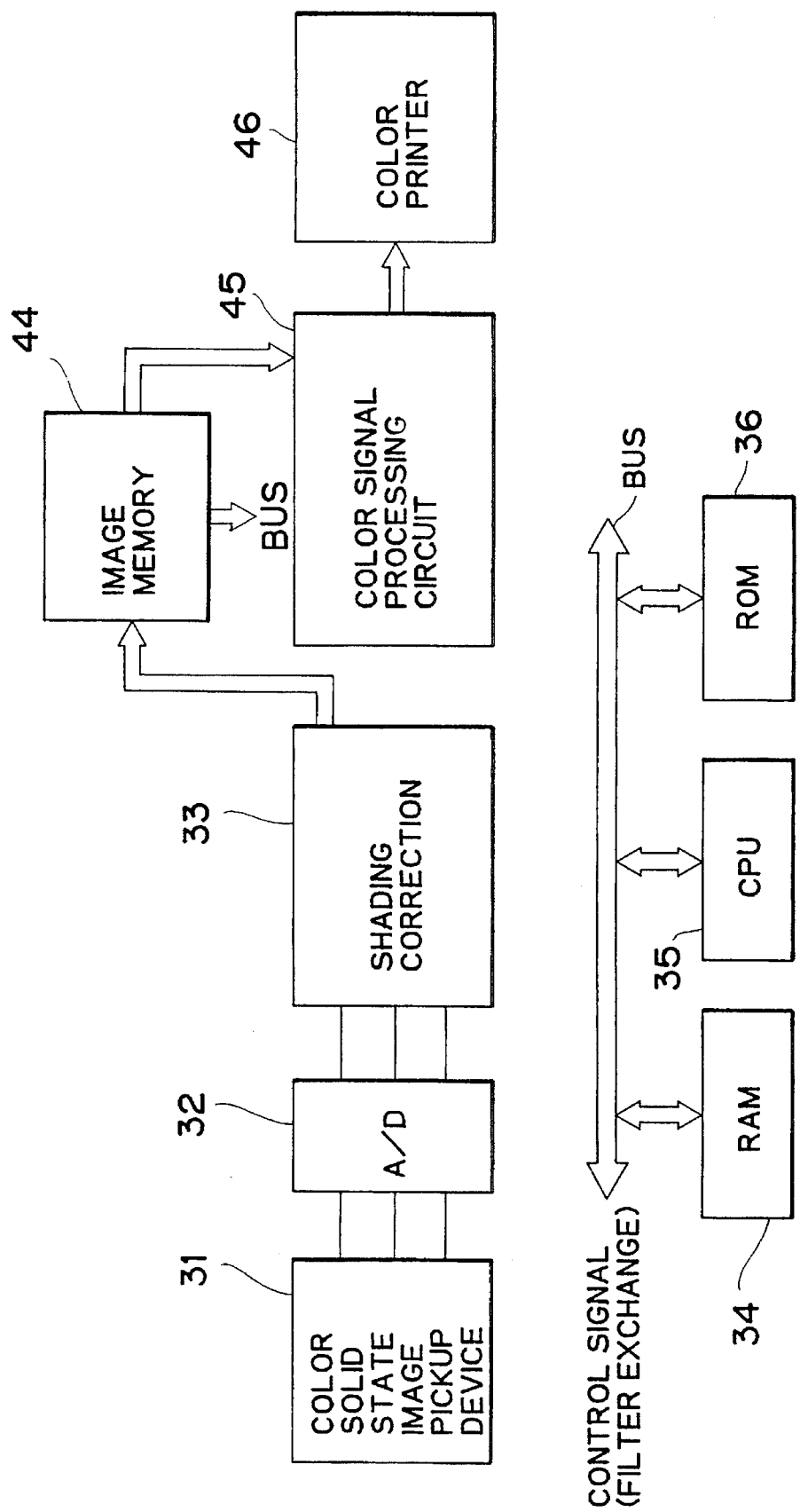
FIG. 8 is a block diagram showing the second embodiment of the present invention.
Figure 9:
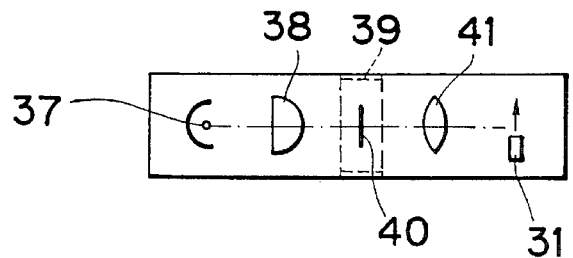
FIGS. 9 and 10 are views showing an arrangement of a reader of the embodiment shown in FIG. 8.
Figure 11:
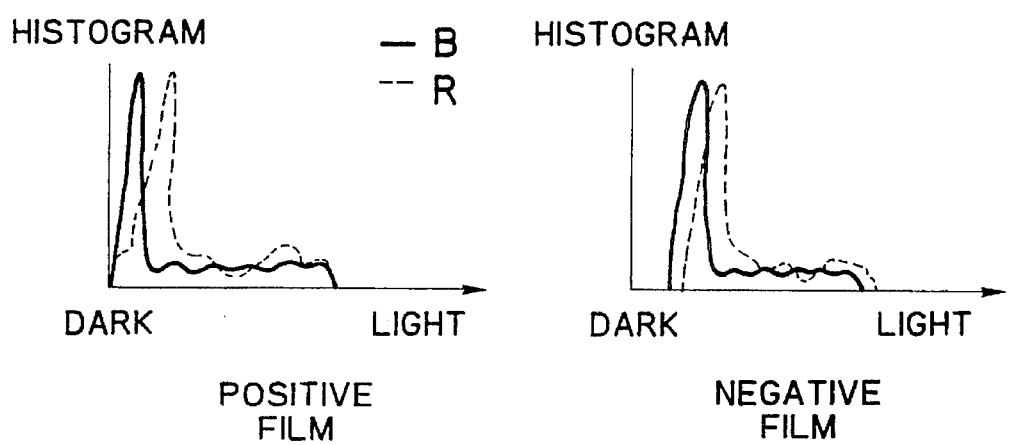
FIG. 11 shows histograms of R and B components of negative and positive films.

FIG. 8 is a block diagram showing the second embodiment of the present invention, and FIG. 9 is a view showing an arrangement of a film reader. In FIG. 9, the film reader includes a light source 37 for illuminating a film. Light emitted from the light source is radiated on a film 40 attached to a film holder 39 via a condenser lens. The light transmitted through the film is focused on a color solid state image pickup device 31 through a projection lens 41. The image pickup device 31 scans a film image while being moved in a direction of an arrow in FIG. 9. A film image signal read in this manner is converted into a digital signal by an A/D converter 32 shown in FIG. 8, and the digital signal is input to a shading correction circuit 33 to correct illuminance nonuniformity of the film image and sensitivity nonuniformity of the image pickup device. The corrected signal for one frame is stored in an image memory 44. When the signal is stored, if the number of data is large, the data are thinned out and stored in the memory 44 in consideration of the number of data. Histograms are formed on the basis of image data stored in the memory 44. FIG. 11 shows histograms of positive and negative films. FIG. 11 shows histograms of red (R) and blue (B) signals. A CPU 35 determines a negative or positive film according to a program stored in a ROM 36 on the basis of the features of the histograms. The discrimination processing will be explained below. Assume that the signal value of a "dark" level is 0 and that of a "light" level is 255 in 8-bit data. Since an image of a negative film includes a smaller number of signals in a dark portion than that of a positive film, the numbers of R, G, and B components below "32" level of pixels are counted. When the count value of each of the R, G, and B components is smaller than a predetermined value, a negative film can be detected; otherwise, a positive film can be detected. A membership function for determining a positive film when the number of data in a region d in FIG. 3 is small and the number of data in a region b is large, and a membership function for determining a positive film when the numbers of data in the regions d and b are small and the number of data in a region g is large can be used. When a negative film is determined according to the discrimination result, a cyan filter 42 is inserted in an optical path; otherwise, the cyan filter 42 is not inserted in the optical path. A signal read by scanning a film image again is output to a color signal processing circuit 45 through the circuit blocks shown in FIG. 8, and is subjected to processing suitable for a positive or negative film. More specifically, when a negative film is determined, input image data is reversed, and is then subjected to processing, e.g., γ conversion. On the other hand, when a positive film is determined, the processing, e.g., γ conversion is executed without reversing the image data. Note that the reason why the cyan filter is inserted upon determination of a negative film is to prevent R, G, and B signals from being unbalanced due to the color, i.e., orange, of a negative film base.

Figure 10:
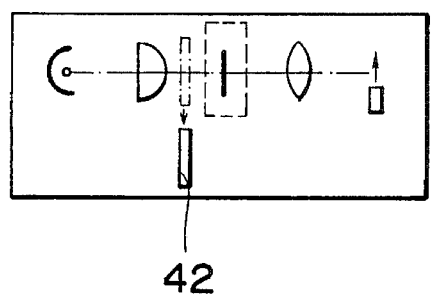

In this embodiment, in order to further improve negative/positive discrimination accuracy, when an image to be detected is a film, the color of a base film may be detected, and negative/positive discrimination may be performed based on the detected color. Signal values in a state wherein the cyan filter is inserted, as shown in FIG. 10, may be stored as $R_{max}$, $G_{max}$, and $B_{MAX}$ in the shading correction circuit 33. When the maximum value of the R, G, and B signals, e.g., the maximum value of min(R, G, B) of a sampled image, is below a given threshold value, a negative film can be determined; otherwise, a positive film can be determined. Since the base film of a negative film always has an orange color, when the color of data having the highest luminance among pixel data for one frame is considered as orange, a negative film can be determined.

The count value of dark portion signals, the maximum value of R, G, and B signals, or a color of the maximum value of the R, G, and B signals may be weighted using membership functions, and discrimination accuracy may be improved by fuzzy deducing.

As described above, according to this embodiment, since a means for extracting a feature amount such as a histogram of a film image signal, and a means for discriminating a negative or positive film on the basis of an extraction result are arranged, films can be discriminated.

The third embodiment of the present invention will be described below with reference to FIG. 12.

Figure 12:
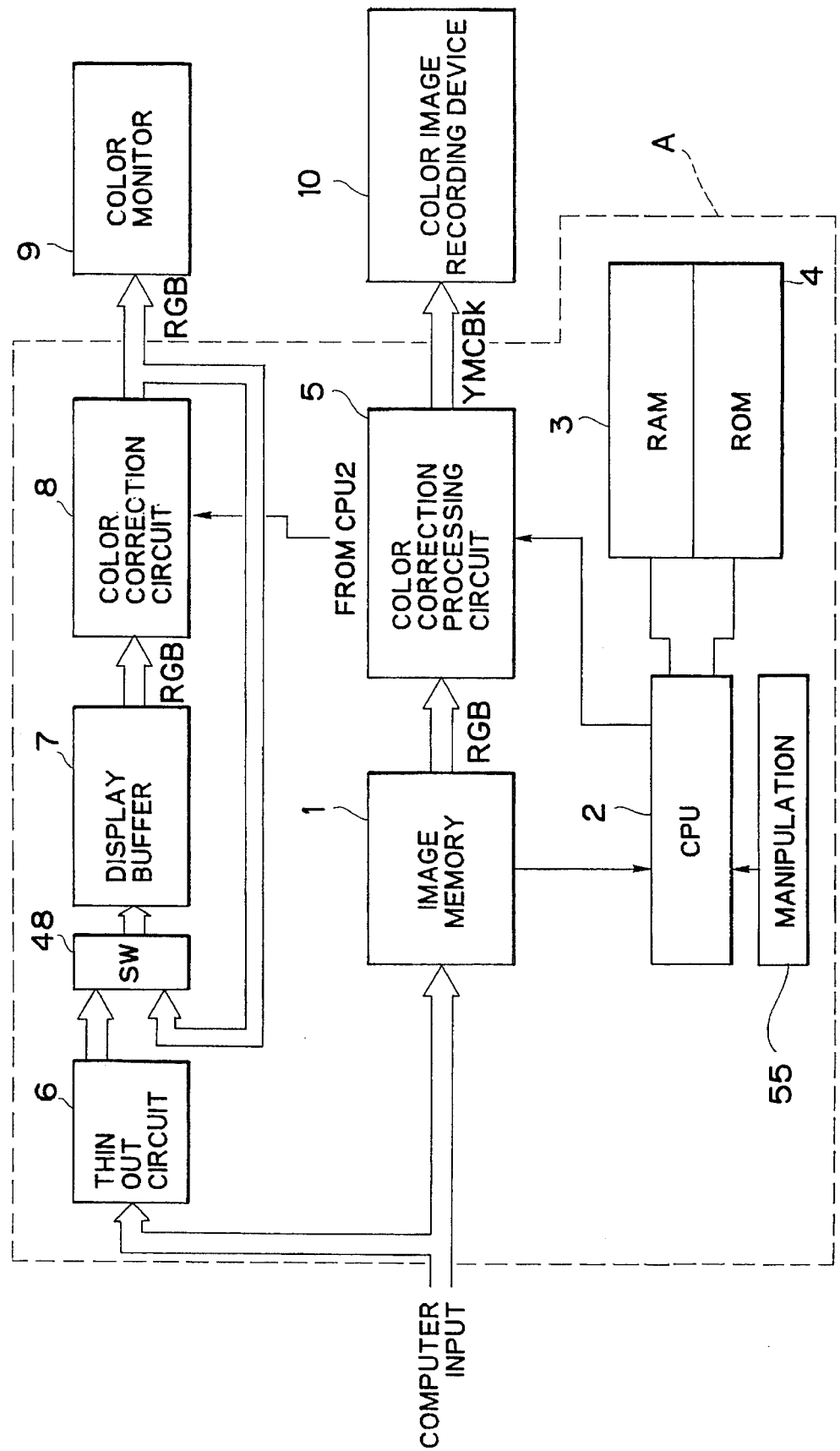
FIG. 12 is a block diagram showing the third embodiment of the present invention.

The same reference numerals in FIG. 12 denote elements having the same functions as those in FIG. 1, and a detailed description thereof will be omitted.

In FIG. 12, a thin out circuit 6 thins out color image data input from a computer, and outputs the thinned-out data to a display buffer 7. A color monitor 9 and a color image recording device 10 have different resolutions. In this case, the resolution of the color image recording device 10 is higher than that of the color monitor 9. Therefore, the capacity of the display buffer 7 is smaller than that of an image memory 1. Image data stored in the display buffer 7 is color-corrected by a color correction circuit 8 of the next stage, and the corrected data is supplied to the color monitor 9. A switch 48 selects one of an output from the thin out circuit 6, and an output from the color correction circuit 8, and supplies the selected output to the display buffer 7. The switch 48 is controlled by a CPU 2. A manipulation unit 55 is used for manually correcting color correction characteristics of the color correction circuit 5. According to this embodiment, the color correction characteristics of the color correction circuit 8 are set by the CPU 2 according to the flow chart shown in FIG. 7. Note that the color correction circuit 8 corrects input R, G, and B data using, e.g., a table, and outputs them as R, G, and B data.

Figure 13:
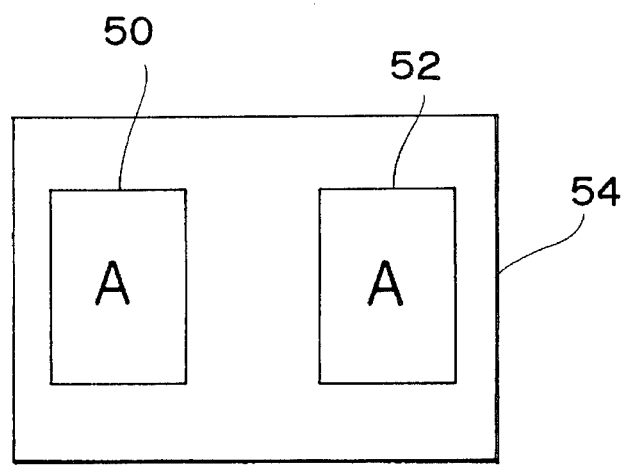
FIG. 13 is a view showing an operation of the embodiment shown in FIG. 12.
Figure 14A:
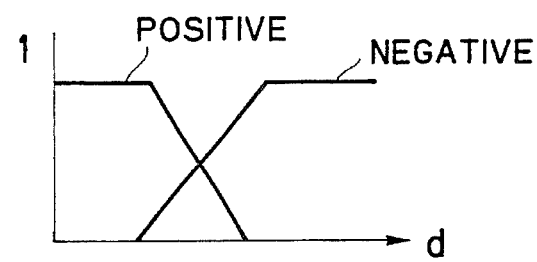
Figure 14B:
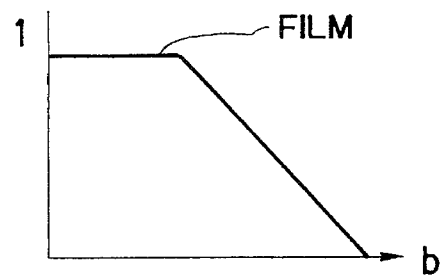
Figure 14C:
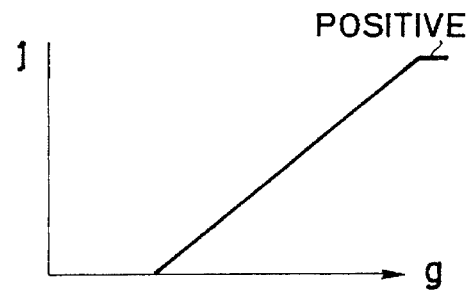

In this embodiment, the color monitor 9 simultaneously displays a non-color-corrected color image 50, and a color-corrected color image 52, as indicated by 54 in FIG. 13.

Such a display operation is executed by controlling the switch 48 and the color correction circuit 8 by the CPU 2.

More specifically, the switch 48 selects color image data thinned out y the thin out circuit 6, and writes it in the display buffer 7.

In this write operation, data is written at a predetermined position on the display buffer 7 corresponding to a display position, as indicated by 50 shown in FIG. 13.

Figure 7:
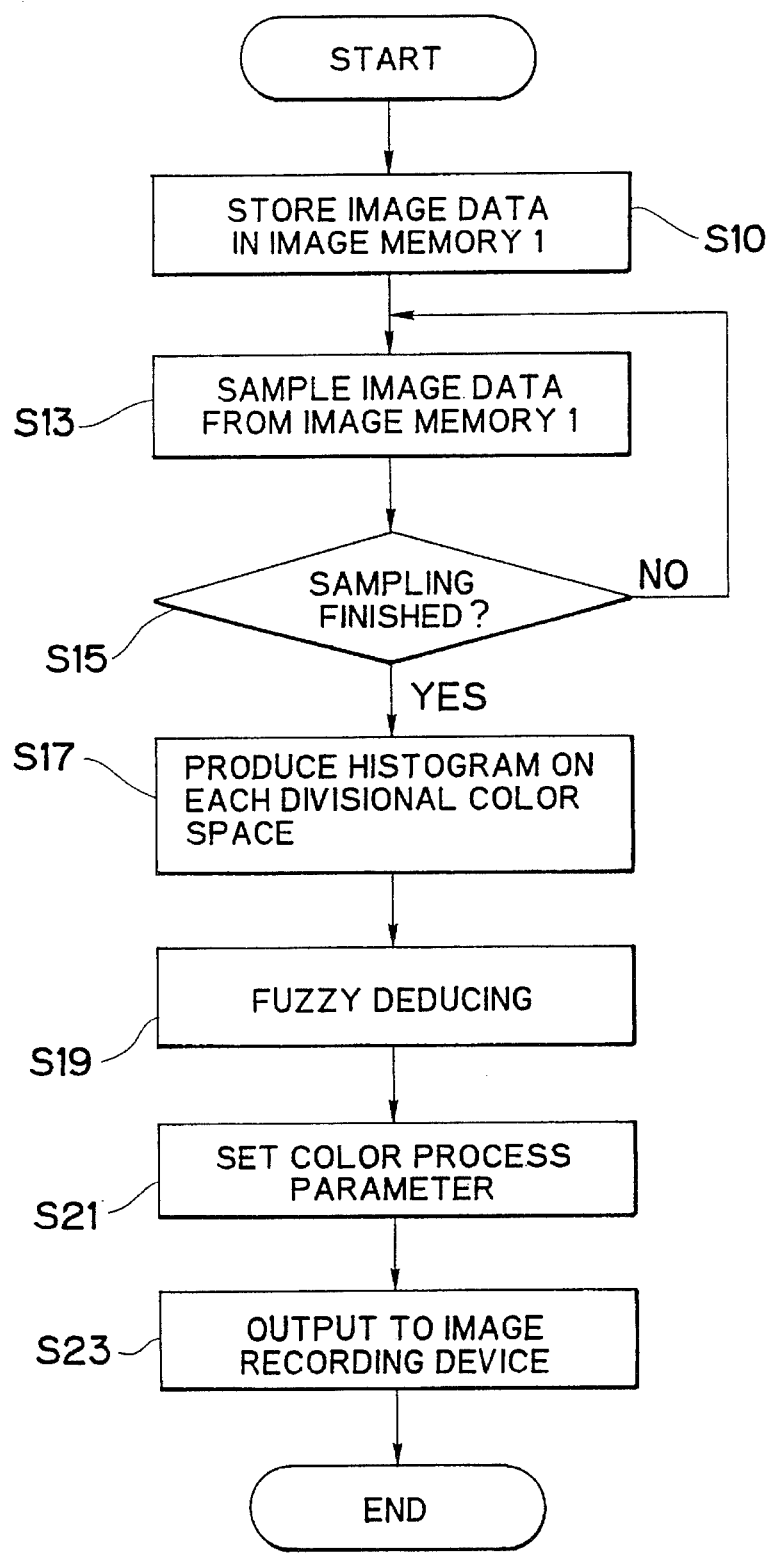
FIG. 7 is a flow chart for explaining an operation of the first embodiment of the present invention.

The CPU discriminates the content of the image memory 1 according to steps S10 to S21 of the flow chart shown in FIG. 7, thereby setting the color correction characteristics of the color correction circuit 8.

The color image data written on the display buffer 7 is temporarily read out, and is color-corrected by the color correction circuit 8. The color-corrected data is written at a predetermined position on the display buffer 7 corresponding to a display position, as indicated by 52 in FIG. 13.

The color correction characteristics of the color correction circuit 8 are set to be linear characteristics, i.e., the circuit 8 is set in a through state, and the image data is displayed on the color monitor 9.

The CPU 2 then checks if there is a manual input from the manipulation unit 55. If a manual input is detected, the color correction state of the color correction circuit 8 is also corrected.

Image data in the image memory 1 is then read out, and the readout data is supplied to the color image recording device 10.

According to this embodiment, the color correction characteristics of the color correction circuit can be automatically controlled according to the type of image, and a color image corresponding to the controlled color correction characteristics can be displayed on the color monitor 9.

Therefore, since the color correction state can be displayed on the color monitor 9 before a recording operation by the color image recording device 10, it is convenient for a user.

Furthermore, the color correction state can also be manually corrected.

In each of the above embodiments, the color image recording device 10 may comprise a color electrophotographic printer, an ink-jet printer, a so-called bubble-jet printer for discharging an ink by film boiling, or a thermal printer.

What is claimed is:

1. A color image processing apparatus comprising:

inputting means for inputting electrical color image signals; and discriminating means for analyzing the electrical color image signals, so as to discriminate a type of the electrical color image signals using a plurality of membership functions, each of which relates to a respectively different characteristic extracted from an electrical color image signal;

wherein the type of the electrical color image signals corresponds to a source of the electrical color image signals.

2. An apparatus according to claim 1, further comprising:

correction means for correcting said electrical color image signals according to a discrimination result of said discrimination means.

3. An apparatus according to claim 2, further comprising:

means for outputting the electrical color image signals corrected by said correction means to a color image recording device.

4. An apparatus according to claim 3, wherein said color image recording device comprises an electrophotographic printer.

5. An apparatus according to claim 3, wherein said color image recording device comprises an ink-jet printer.

6. An apparatus according to claim 1, wherein each of the membership functions is a function that indicates a region which includes input electrical color image signals on a color space divided into a plurality of regions.

7. A color image processing apparatus according to claim 1, wherein said discrimination means derives a histogram of the electrical color image signals for plural areas in a divided color space, and uses measured values for the plural areas as inputs for the plurality of membership functions.

8. A color image processing apparatus according to claim 1, wherein said source of the electrical color image signals is a still video (SV) apparatus.

9. A color image processing apparatus according to claim 1, wherein said source of the electrical color image signals is negative film.

10. A color image processing apparatus according to claim 1, wherein said source of the electrical color image signals is positive film.

11. A color image processing apparatus according to claim 1, wherein said source of the electrical color image signals is an image reader.

12. A color image processing apparatus according to claim 1, wherein the type of the electrical color image signals corresponding to said source of the electrical color image signals is a computer graphic (CG) image.

13. A color image processing method comprising the steps of:

inputting electrical color image signals; and analyzing the electrical color image signals so as to discriminate a type of the electrical color image signals using a plurality of membership functions, each of which relates to a respectively different characteristic extracted from an electrical color image signal;

wherein in the analyzing step, the type of the electrical color image signals corresponds to a source of the electrical color image signals.

14. A color image processing apparatus, comprising:

storing means for storing input color image data for one frame of an image;

discrimination means for analyzing the input color image data stored in said storing means, so as to discriminate a type of the input color image data using a plurality of membership functions, each of which represents a respectively different image characteristic;

correction means for correcting the input color image data according to a discrimination result of said discrimination means, and means for outputting the input color image data corrected by said correction means to a color image recording device, wherein said color image recording device comprises a printer for discharging an ink by film boiling, and wherein the type of the input color image data corresponds to a source of the input color image data.

15. A color image processing apparatus according to claim 14, wherein said discrimination means derives a histogram of the input color image data for plural areas divided into a color space, and uses measured values for the plural areas as inputs for the plurality of membership functions.

16. A color image processing apparatus comprising:

storing means for storing input color image data for one frame; and discrimination means for analyzing the input color image data stored in said storing means, so as to discriminate a type of the input color image data using a plurality of membership functions, each of which represents a respectively different image characteristic, wherein said discrimination means discriminates whether or not the type of the input color image data is a computer graphic image.

17. A color image processing apparatus according to claim 16, wherein said discrimination means derives a histogram of the input color image data for plural areas in a divided color space, and uses measured values for the plural areas as inputs for the plurality of membership functions.

18. A color image processing apparatus comprising:

input means for inputting electrical color image signals; and discrimination means for analyzing the electrical color image signals, so as to discriminate a type of the electrical color image signals using a plurality of membership functions, each of which represents a respectively different image characteristic, wherein said discrimination means discriminates whether the type of the electrical color image signals input from said input means is a negative color image or a positive color image.

19. An apparatus according to claim 18, further comprising:

correction means for correcting the electrical color image signals according to a discrimination result of said discrimination means.

20. An apparatus according to claim 19, further comprising:

means for outputting the electrical color image signals corrected by said correction means to a color image recording device.

21. An apparatus according to claim 18, wherein each of the membership functions is a function that indicates a region which includes input electrical color image signals on a color space divided into a plurality of regions.

22. A color image processing apparatus according to claim 18, wherein said discrimination means derives a histogram of the electrical color image signals for plural areas in a divided color space, and uses measured values for the plural areas as inputs for the plurality of membership functions.

* * * * *